United States Patent
Peng et al.

(10) Patent No.: US 8,699,307 B2
(45) Date of Patent: Apr. 15, 2014

(54) NEAR-FIELD TRANSDUCER

(71) Applicant: Seagate Technology LLC, Cupertino, CA (US)

(72) Inventors: Chubing Peng, Eden Prairie, MN (US); Edward Charles Gage, Lakeville, MN (US); Yongjun Zhao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/789,197

(22) Filed: Mar. 7, 2013

(65) Prior Publication Data

US 2014/0036646 A1     Feb. 6, 2014

Related U.S. Application Data

(60) Provisional application No. 61/677,818, filed on Jul. 31, 2012.

(51) Int. Cl.
    *G11B 11/00*     (2006.01)

(52) U.S. Cl.
    USPC ............... 369/13.33; 369/13.13; 369/112.27

(58) Field of Classification Search
    USPC .......... 369/13.33, 13.32, 13.24, 13.14, 13.03, 369/13.02, 13.12, 13.13, 13.22, 13.01, 369/13.35, 13.17, 112.27, 112.09; 360/59, 360/125.31, 125.74, 125.75, 125.3, 125.32
    See application file for complete search history.

(56) References Cited

U.S. PATENT DOCUMENTS

| | | | |
|---|---|---|---|
| 7,272,079 | B2 | 9/2007 | Challener |
| 8,320,219 | B1 | 11/2012 | Wolf et al. |
| 8,320,220 | B1 | 11/2012 | Yuan et al. |
| 8,339,739 | B2 | 12/2012 | Balamane et al. |
| 8,391,108 | B2 | 3/2013 | Peng et al. |
| 8,406,094 | B2 | 3/2013 | Matsuoto |
| 8,451,705 | B2 * | 5/2013 | Peng et al. ............... 369/112.27 |
| 2012/0218871 | A1 | 8/2012 | Balamane et al. |

* cited by examiner

*Primary Examiner* — Ali Neyzari
(74) *Attorney, Agent, or Firm* — Hollingsworth Davis, LLC

(57) ABSTRACT

An apparatus includes a waveguide core having an elongated edge parallel to a substrate plane of the apparatus. An output end of the waveguide core faces a media-facing surface of the apparatus. A plate-like portion of a plasmonic material has a major surface facing the elongated edge of the waveguide core, and the major surface has a narrowed output end facing the media-facing surface. An elongated ridge of the plasmonic material is disposed on at least part of the plate-like portion between an input end and the narrowed output end.

20 Claims, 12 Drawing Sheets

NEAR-FIELD TRANSDUCER

RELATED PATENT DOCUMENTS

This application claims the benefit of Provisional Patent Application Ser. No. 61/677,818 filed on Jul. 31, 2012, to which priority is claimed pursuant to 35 U.S.C. §119(e) and which is hereby incorporated herein by reference in its entirety.

SUMMARY

Various embodiments described herein are generally directed to an apparatus having a near-field transducer. In one embodiment, an apparatus includes a waveguide core having an elongated edge parallel to a substrate plane of the apparatus. An output end of the waveguide core faces a media-facing surface of the apparatus. A plate-like portion of a plasmonic material has a major surface facing the elongated edge of the waveguide core, and the major surface has a narrowed output end facing the media-facing surface. An elongated ridge of the plasmonic material is disposed on at least part of the plate-like portion between an input end and the narrowed output end.

In another embodiment, an apparatus includes a waveguide core extending towards a media-facing surface of the apparatus. The apparatus further includes a magnetic recording pole proximate the media-facing surface, and a near-field transducer disposed between the waveguide core and the magnetic recording pole. The near-field transducer includes a plate-like portion of a plasmonic material having a first major surface facing the waveguide core and a second major surface facing the magnetic recording pole. A projection of the plate-like portion onto a substrate-parallel plane has a narrowed output end facing the media-facing surface. The near-field transducer further includes an elongated ridge of the plasmonic material disposed on at least part of on the first major surface or the second major surface between an input end and the narrowed output end of the plate-like portion.

In another embodiment, a method involves coupling energy into a waveguide core having an elongated edge parallel to a substrate plane of an apparatus. Responsive to the energy being coupled to the waveguide, surface plasmon waves are excited at a major surface of a plate-like portion of a plasmonic material, the major surface facing the elongated edge of the waveguide core. The surface plasmon waves are coupled to an elongated ridge of the plasmonic material. The elongated ridge is disposed lengthwise on the plate-like portion between at least part of an input end and a narrowed output end of the plate-like portion. The surface plasmon waves are directed via the narrowed output end to heat a recording medium proximate a media-facing surface of the apparatus.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 6-8 are a schematic diagrams illustrating split waveguides according to example embodiment;

FIG. 8 is a graph showing results of analytic modeling used to determine absorption of near-field transducer geometries according to example embodiments;

DETAILED DESCRIPTION

Figure 1:
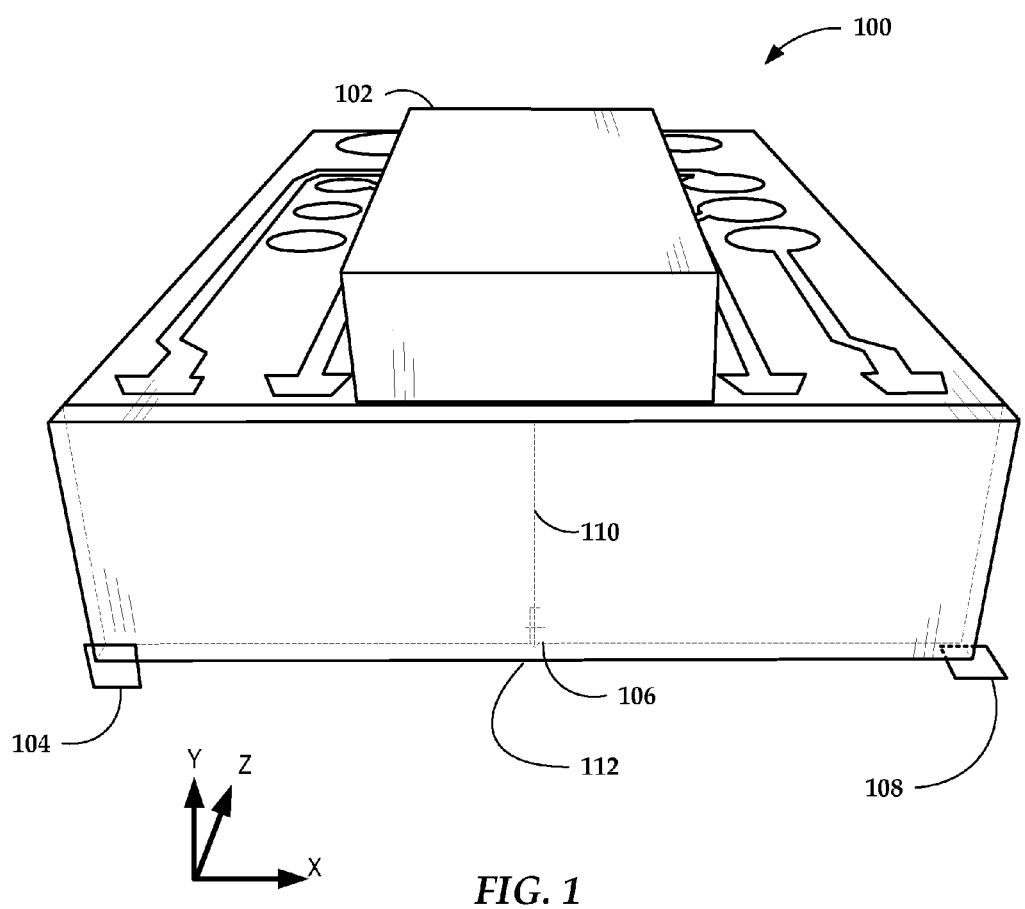
FIG. 1 is a perspective view of a slider according to an example embodiment.

The present disclosure relates to waveguide structures that deliver energy (e.g., light) to a near-field transducer (NFT). An NFT and waveguide described herein may be usable in any application where a beam of highly focused and relatively powerful electromagnetic energy is desired. One such application is in heat assisted magnetic recording (HAMR), also referred to as thermally assisted magnetic recording (TAMR). In reference to FIG. 1, a perspective view shows an example HAMR slider 100. This example slider 100 includes a laser diode 102 located on top of the slider 100 proximate to a trailing edge surface 104 of the slider 100. The laser diode 102 delivers light proximate to a HAMR read/write head 106, which has one edge on an air bearing surface 108 of the slider 100. The air bearing surface 108 faces and is held proximate to a moving media surface (not shown) during device operation.

The laser diode 102 provides electromagnetic energy to heat the media at a point near to the read/write head 106. Optical coupling components, such as a waveguide 110, are formed integrally within the slider device 100 to deliver light from the laser 102 to the media. In particular, a local waveguide 110 and NFT 112 may be located proximate the read/write head 106 to provide local heating of the media during write operations. The laser diode 102 in this example may be an integral, edge firing device, although it will be appreciated that the waveguide 110 and NFT 112 may be used with any light source and light delivery mechanisms. For example, a surface emitting laser (SEL) may be used instead of an edge firing laser.

While the example in FIG. 1 shows a laser 102 integrated with the slider 100, the NFT 112 discussed herein may be applicable to any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to a slider-integrated waveguide 110 which energizes the NFT 112.

A HAMR device utilizes the types of optical devices described above to heat a magnetic recording media (e.g., hard disk) in order to overcome superparamagnetic effects that limit the areal data density of typical magnetic media. When writing to a HAMR medium, the light is concentrated into a small hotspot over the track where writing takes place. The light propagates through a waveguide 110 where it is coupled to the NFT 112, e.g., either directly from the waveguide or by way of a focusing element. Other optical elements, such as couplers, mirrors, prisms, etc., may also be formed integral to the slider. The optical elements used in HAMR recording heads are generally referred to as integrated optics devices.

The field of integrated optics relates to the construction of optics devices on substrates, sometimes in combination with electronic components, to produce functional systems or subsystems. For example, an integrated optics device may transfer light between components via dielectric slab or three-dimensional channel waveguides that are built up on a substrate using layer deposition techniques. These waveguides may be formed as a layer of materials with appropriate relative refractive indices so that light propagates through the waveguide in a similar fashion as through an optic fiber.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device designed to reach local surface plasmon resonance at a designed wavelength. A waveguide and/or other optical element concentrates light on a transducer region (e.g., focal region) where the NFT 112 is located. The NFT 112 is designed to achieve surface plasmon resonance in response to this concentration of light. At resonance, a high electric field surrounds the NFT 112 due to the collective oscillations of electrons at the metal surface. Surface plasmon waves induced by this field will tunnel into a storage medium and get absorbed, thereby raising the temperature of a spot on the media as it being recorded.

Figure 2:
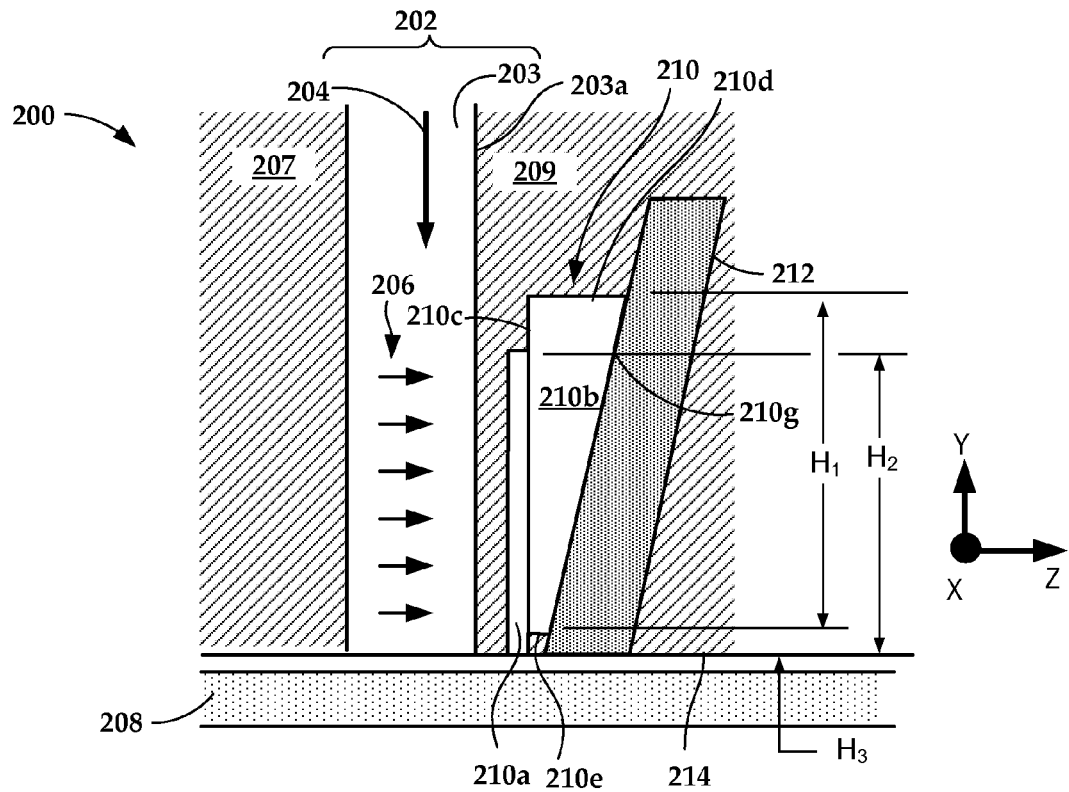
FIG. 2 is a side cross-sectional view of a near-field transducer and waveguide according to an example embodiment.

In reference now to FIG. 2, a cross-sectional view shows details of an NFT 210 and waveguide 202 of a HAMR apparatus 200 according to an example embodiment. The NFT 210, waveguide 202, and other components are built on a substrate plane, which is parallel to the xy-plane in this view. An NFT 210 is located proximate a media-facing surface 214 (e.g., ABS), which is held near a recording medium 208 during device operation, e.g., magnetic disk. In the orientation of FIG. 2, the media-facing surface 214 is arranged parallel to the x-z plane. An elongated waveguide core 203 may be disposed proximate the NFT 210, the NFT 210 being located at or near the media-facing surface 214.

The waveguide core 203 is shown configured as a three-dimensional channel waveguide, and is surrounded by cladding layers 207, 209 that have different indices of refraction than the core 203. Other waveguide configuration may be used instead of a channel waveguide, e.g., planar waveguide. Light 204 propagates through the waveguide core 203 along the negative y-direction. Electrical field lines 206 emanate from the waveguide core 203 and excite the NFT 210. The NFT 210 delivers surface plasmon enhanced, near-field electromagnetic energy along the negative y-direction where it exits at the media-facing surface 214. This may result in a highly localized hot spot (not shown) on the media 208. Further illustrated in FIG. 2 is a magnetic recording pole 212 that is located alongside the NFT 210. The recording pole 212 generates a magnetic field (e.g., perpendicular field) used in changing the magnetic orientation of the hotspot during writing.

The NFT 210 includes a plate-like portion 210b of plasmonic material (e.g., gold, silver, copper, and combinations or alloys thereof). The plate-like portion 210b is so named because it has a first major surface 210c with xy-plane dimensions that are significantly larger than z-dimension thickness of the plate-like portion 210b. The major surface 210c faces an elongated edge 203a of the waveguide core 203. The NFT 210 further includes an elongated ridge 210a of plasmonic material is disposed lengthwise on the major surface between an input end 210d of the plate-like portion 210b and the output end 210e of the plate-like portion 210b. As will be described in greater detail below, the projection of the plate-like portion 210b onto the xy-plane is narrowed at the output end.

The NFT 210 is excited by a waveguide mode of the three-dimensional channel waveguide 202, polarized with the dominant electric field 206 normal to the plasmonic metal surfaces of the NFT 210, e.g. major surface 210c of plate-like portion 210b. The plate-like portion 210b also includes a second major surface 210g that faces, and in this example directly contacts, magnetic pole 212. The plate-like portion 210b of the NFT 210 is shaped to condense the field and the ridge 210a is designed to resonate such that the NFT efficiency is enhanced on one hand, and on the other hand scattering of the field is reduced along the circumference of the plate-like portion 210b.

While the term "input end" is used to for purposes of convenience to describe region 210d of the plate-like portion 210b, it will be appreciated that excitation of the NFT 210 may occur over a large portion (e.g., major surface 210c) of the plate-like portion 210b, and is not meant to limit where or how the NFT 210 may be excited by energy delivered by the waveguide 202. Generally, it will be understood that the NFT 210 is designed to direct the surface plasmons from the output end 210e to the media 208 when the media 208 is proximate to the media-facing surface 214.

The end of the elongated ridge 210a protrudes out from the plate-like portion 210b near the media-facing surface 214. This protrusion can improve NFT efficiency and thermal gradient for writing sharp magnetic transitions. Surface plasmon waves are generated mainly at surfaces of elongated ridge 210a and plate-like portion 210b nearest the channel waveguide core 203. The protruded portion may have different cross-section and or size from the ridge 210a.

The waveguide mode is $TM_{00}$, which is fundamental and transverse-magnetic polarized. The dominant electric field 206 is along z-direction and normal to the major surface 210c of the plate-like portion 210b. The mode index of the dielectric waveguide 202 is close to that of the surface-plasmon waves, therefore surface-plasmon waves are efficiently excited on the plate-like portion 210b. The elongated ridge 210a functions as a monopole antenna. At resonance, it interacts with the dielectric waveguide mode as well as the surface-plasmon waves generated on the plate-like portion 210b, which pulls the field toward itself and delivers the optical energy into the recording media 208.

Figure 3:
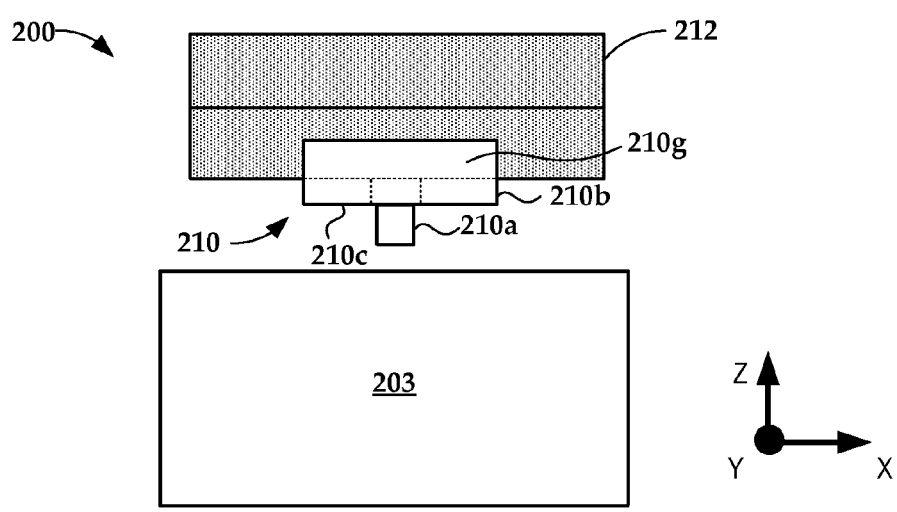
FIG. 3 is a top view of the near-field transducer and waveguide shown in FIG. 2.

In reference now to FIG. 3, a top view (e.g., looking in the negative y-direction towards the media 208 as shown in FIG. 2) shows the waveguide core 203, NFT 210 and write pole 212 of FIG. 2. Hidden lines in plate-like portion 210b indicate tapers between the input and output ends 210d, 210e as shown in FIG. 2. The horizontal hidden line indicated a z-dimension taper as seen in FIG. 2. The vertical hidden lines indicate a x-dimension taper that forms the narrowed output end of the plate-like portion as described above, and as shown in the example of FIG. 4.

Figure 4:
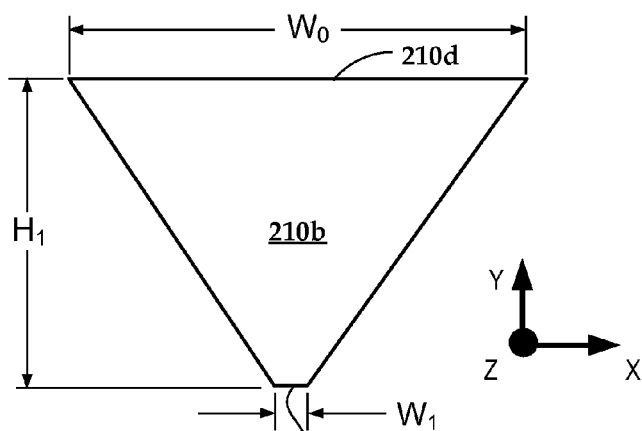
FIGS. 4 and 5 are plan views showing portions of a near-field transducer according to an example embodiment.
Figure 5:
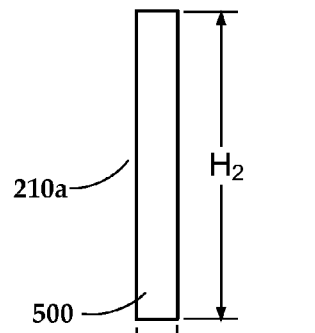

In FIG. 4, a plan view illustrates the projection of the major surface of the plate-like portion 210b. This view is representative of a projection of the plate-like portion 210b on the substrate parallel xy-plane, and illustrates the trapezoidal in-plane shape of this NFT portion 210b. This portion may also have different planar projection shapes, as will be discussed further below. In FIG. 5, a plan view shows the shape of the elongated ridge 210a as projected on the xy-plane. The elongated ridge 210a serves as a nano-rod monopole antenna. A portion 500 of the elongated ridge 210a may protrude towards the media-facing surface beyond the plate-like portion 210b. The protruded portion 500 may have different size and/or shape than the rest of the elongated ridge 210a.

Also seen in FIGS. 2, 3, and 4, are NFT dimensions $H_1$, $H_2$, $H_3$, $W_0$, $W_1$, $W_2$. An analysis (discussed in further detail below) was performed on an NFT having shapes similar to the plate-like portion 210b and elongated ridge 210a shown in FIGS. 2-5. In the analysis, some of dimensions $H_1$, $H_2$, $H_3$, $W_0$, $W_1$, $W_2$, were varied to determine optimum geometry for a particular set of design assumptions.

Figure 6:
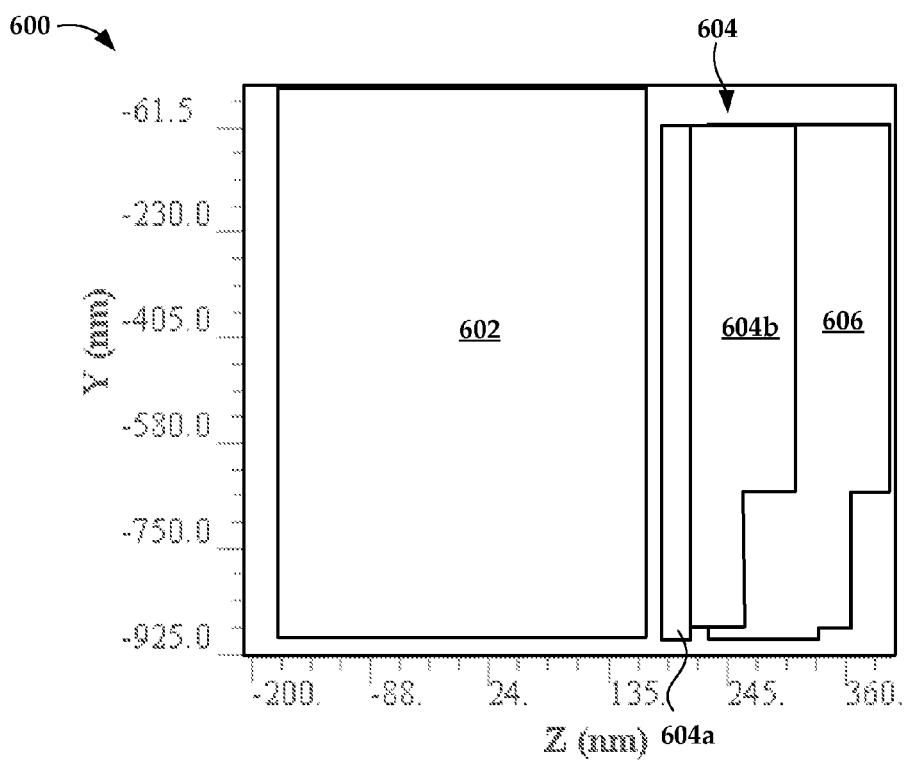
FIGS. 6 and 7 are graphs showing geometry details of near-field transducers according to example embodiments.
Figure 7:
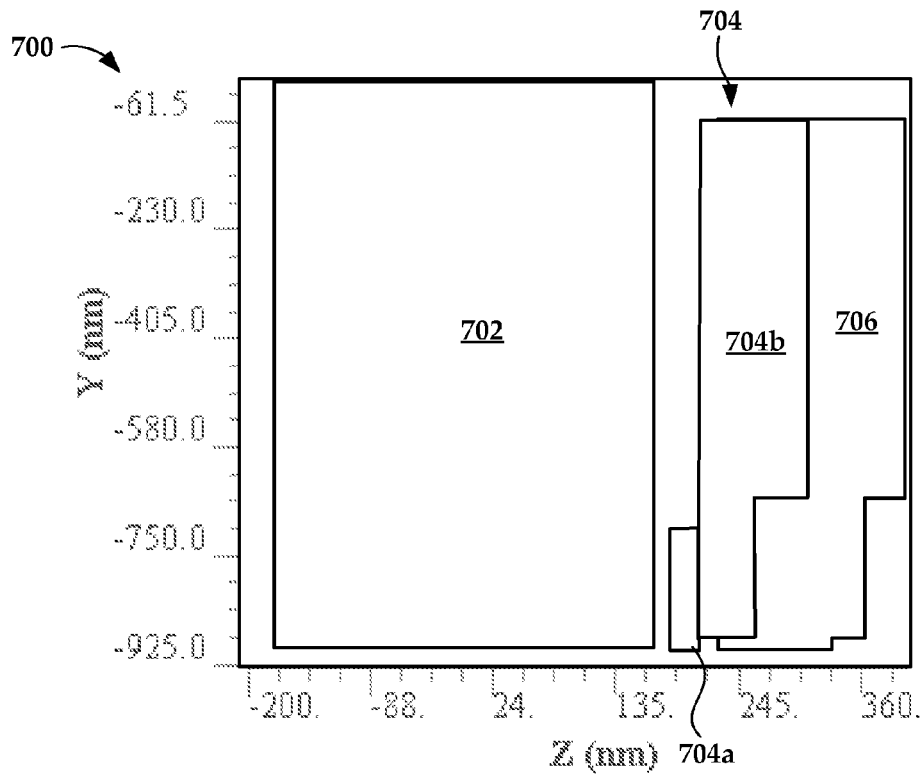

In FIGS. 6 and 7, graphs illustrate yz-plane dimensions used for modeling an NFT according to example embodiments. In both of these figures, the media facing surface is near the bottom of the graphs, e.g., near y=−925 nm. In FIG. 6, the graph shows a waveguide core 602 proximate an NFT 604 and recording pole 606. The NFT 604 includes a plate like portion 604b and a ridge 604a that extends along the full y-dimension length of the plate-like portion 604b. In FIG. 7, the graph shows a waveguide core 702 proximate an NFT 704 and recording pole 706. The NFT 704 includes a plate like portion 704b and a ridge 704a that extends along only part (e.g., about 170 nm) of the plate-like portion 704b in the y-direction.

In the NFT analysis, the waveguide was assumed to include a $Ta_2O_5$ core 602, 702 with index of refraction n=2.13 and $Al_2O_3$ cladding of n=1.70. Both waveguide cores 602, 702 are 600-nm wide (along the x-direction) and 350 nm thick (along the z-direction). The material for both NFT 604 and 704 is gold, n=0.188+j 5.39. The surface-plasmon generating plate-like portions 604b, 704b have the dimension: $W_0$=600 nm and $W_1$=60, 80, or 100 nm. The height ($H_1$) is optimized. The elongated ridges 604a, 704a have $W_2$=40 nm wide along x-direction and 30-nm thick along z-direction. The downward protruding portions of the elongated ridges 604a, 704a are 20-nm in height. For this modeling, stacked poles 606, 706 are used. The plate-like portions 604b, 704b are at least 50-nm thick (along the z-direction). The light wavelength in this analysis was set to λ=830 nm.

Two cases were modeled. The first case is shown in FIG. 6, where the elongated ridge 604a is as long in the y-direction as the plate-like portion 604b ($H_2$=$H_1$). For the second case, the elongated ridge 704a is shorter than the plate-like portion 704b, as seen in FIG. 7 ($H_2$<$H_1$). The distance between the cores 602, 702 and respective ridges 604a, 704a is 15 nm. The magnetic pole width along the x-direction is 300 nm, and the respective separation between the elongated ridges 604a, 704a and the write poles 606, 706 is 20 nm at the protruded portion.

The media was modeled as a 12.6 nm thick FePt magnetic layer (n=2.549+j 2.72), a 10-nm MgO layer (n=1.70), and a 60-nm Cu layer (n=0.26+j 5.26) on a glass substrate (n=1.50). NFT-media spacing is 8-nm, n=1.2116. To evaluate the NFT configurations, the analyses determine CE50 efficiency, which is defined as the light absorption in the recording layer and in a footprint of 50 nm by 50 nm.

For comparison, a baseline NFT design (not shown) is also simulated. The baseline simulation does not have an elongated ridge, just a plate-like portion with a peg protruding from the output end towards the media-facing surface. The peg has the same dimension as the elongated ridge described above, which is 40 nm wide along the x-direction, 30-nm thick along the z-direction, and 20-nm high along the y-direction. The optimal dimension for this design has been found to be as follows: $H_1$=950 nm, $W_0$=600 nm, and $W_1$=50 nm. The waveguide core is 600 nm wide and 400 nm thick. The separation between NFT and core is 25 nm. The NFT efficiency CE50=0.0289, light absorption in the NFT, including the pole, is 0.43. The full-width-at-half-maximum (FWHM) optical spot size in the middle of the recording plane is 68-nm along x-direction (cross-track), and 56.8-nm along z-direction (down-track).

Figure 8:
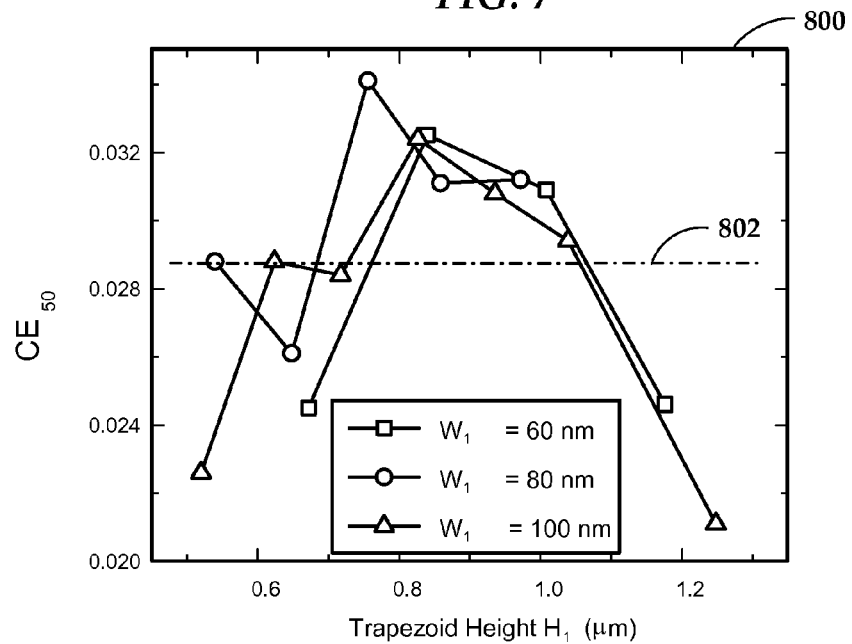
Figure 9:
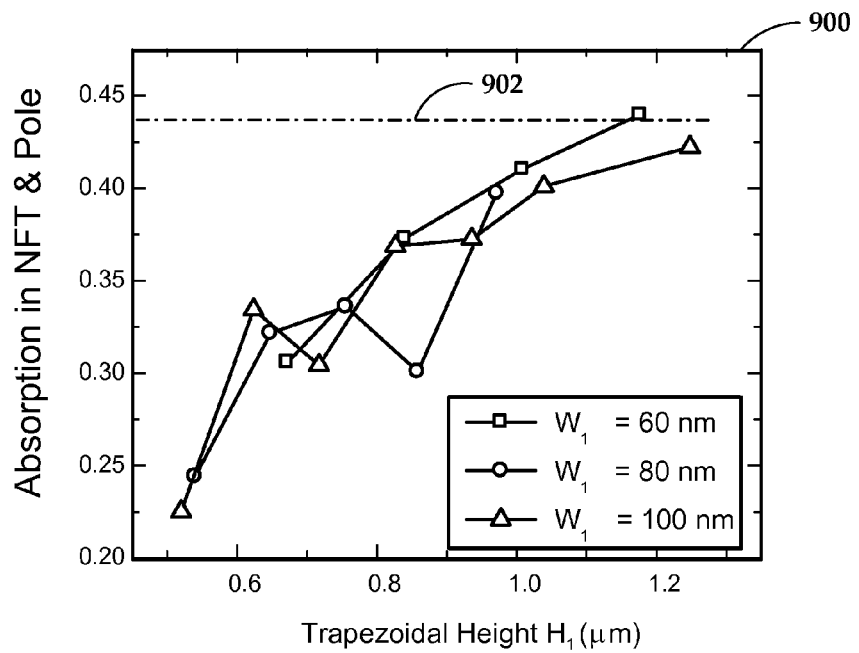
FIG. 9 is a graph showing results of analytic modeling used to determine coupling efficiency of near-field transducer geometries according to example embodiments.

In FIGS. 8 and 9, graphs 800 and 900 shows the transducer efficiency (CE50) and light absorption in the NFT and magnetic pole as a function of trapezoidal height $H_1$ of the elongated ridge at trapezoidal end width $W_1$=60, 80, and 100 nm for the NFT configuration shown in FIG. 6. For comparison, similar results for the baseline NFT are shown dashed line 802, 902. It is seen that transducer efficiency is improved by approximately 17% at the optimal trapezoidal height compared to the baseline. It is also seen that light absorption in the NFT decreases with increasing end width $W_1$ and it could be as much as 20% lower than the baseline design, at the optimal height for NFT efficiency.

Figure 10:
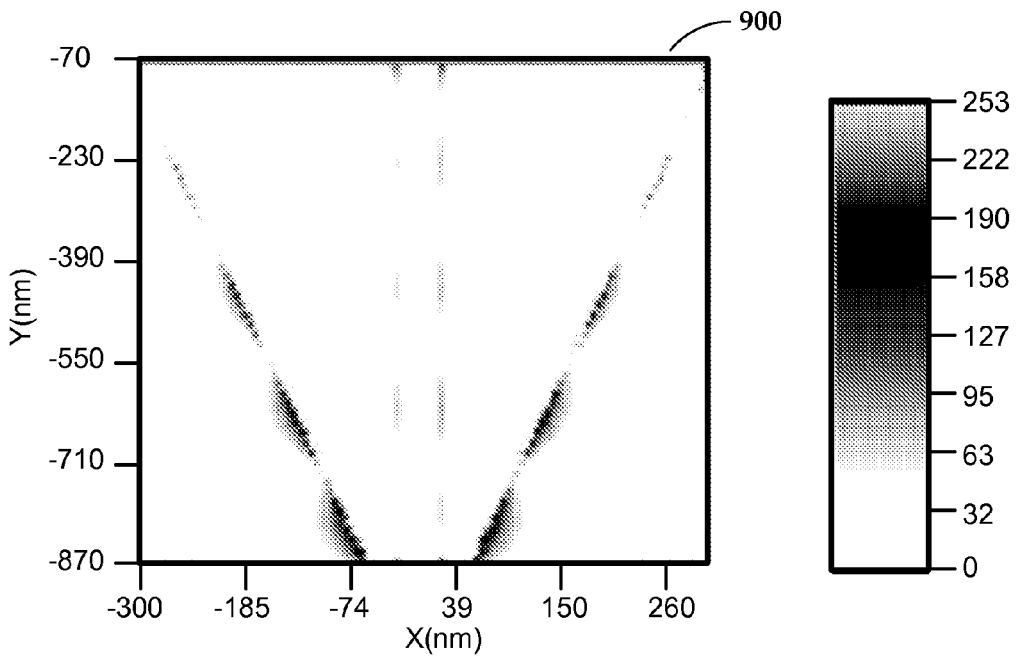
FIGS. 10 and 11 are graphs showing results of analytic modeling to determine respective Ex and Ez transverse electric field components according to example embodiment.
Figure 11:
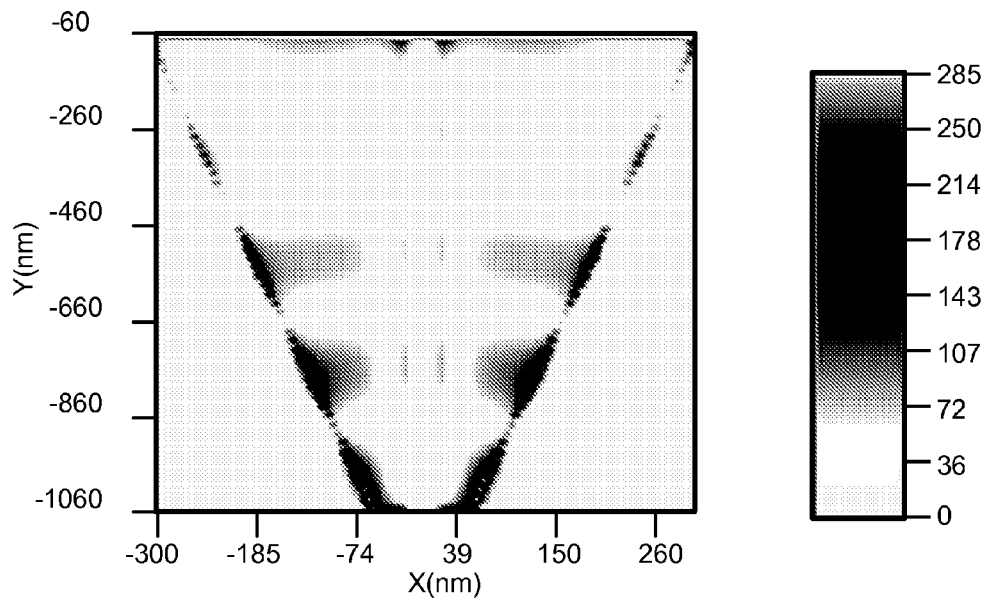

To clarify the proof of concept, another analysis was undertaken to determine a profile of electric field at a plane parallel to the plate-like portion and 5-nm away from the plate-like portion in the cladding. The results are shown in FIGS. 10 and 11. In FIG. 10, a graph shows distribution of the x-component (Ex) of the electrical field, and in FIG. 11 a graph shows distribution of the z-component (Ez) of the electrical field. A similar analysis was performed for a baseline configuration without an elongated ridge. To more closely compare with the baseline design, the pole width of the baseline design was reduced from 300 nm to 80 nm such that the NFT efficiency is the same between an optimum configuration of the current design and the baseline design. It was found that the magnitude of field (Ex and Ez) along the circumference is much reduced in the current design. Lower circumference field means lower light absorption, light scattering, and less sensitivity to fabrication.

Figure 12:
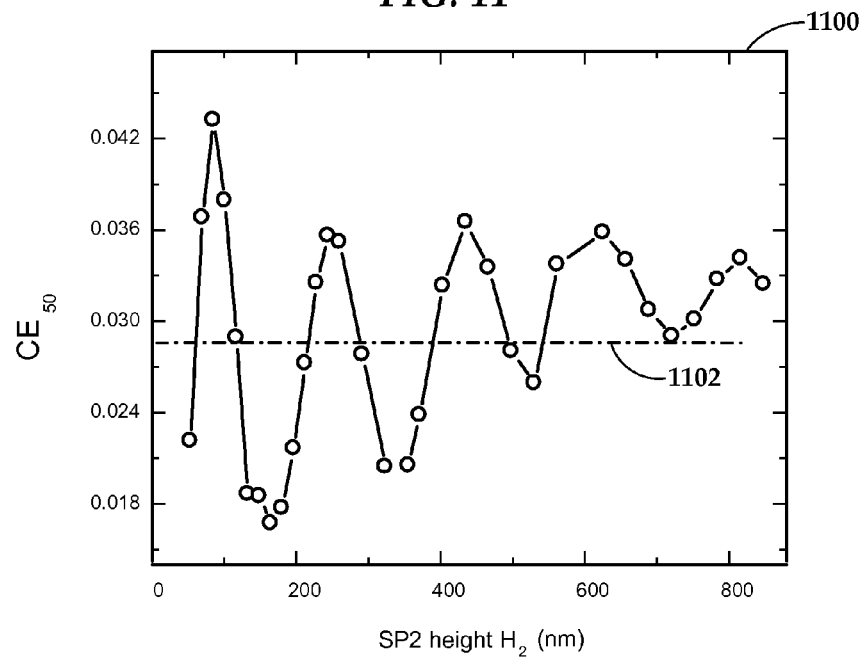
FIG. 12 is a graph showing results of analytic modeling used to determine coupling efficiency of near-field transducer geometries according to example embodiments.
Figure 13:
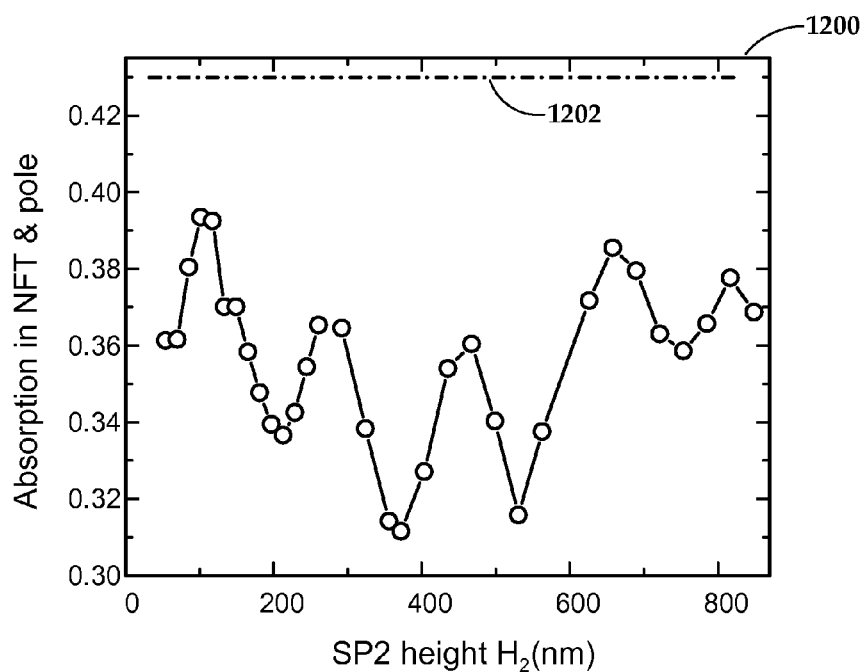
FIG. 13 is a graph showing results of analytic modeling used to determine absorption of near-field transducer geometries according to example embodiments.

In FIGS. 12 and 13, graphs 1200, 1300 respectively show the transducer efficiency, CE50, and light absorption in the NFT as a function of the elongated ridge height $H_2$ for the configuration shown in FIG. 7. This can be compared to a result of the same calculations for the baseline configuration, shown by lines 1202 and 1302 in graphs 1200 and 1302, respectively. In this modeling, the dimension of the plate-like portion (e.g., portion 704b in FIG. 7) is fixed as follows: $W_0$=600 nm, $W_1$=100 nm, and $H_1$=826.8 nm. It is seen that both transducer efficiency and light absorption in the NFT oscillate with ridge height. Sharper resonance occurs for shorter ridges. At the first peak, transducer efficiency is 55% greater while the light absorption in the NFT is 10% lower than that of the baseline configuration.

Figure 14:
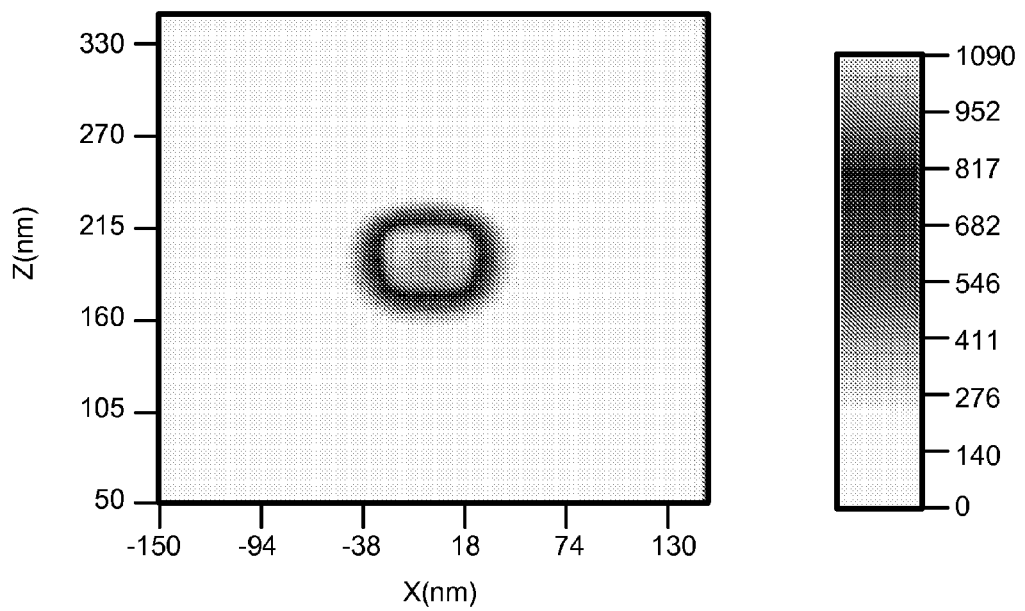
FIGS. 14 and 15 are graphs showing results of analytic modeling used to determine profile of light absorption in middle plane of a recoding layer using a near-field transducer according to an example embodiment.
Figure 15:
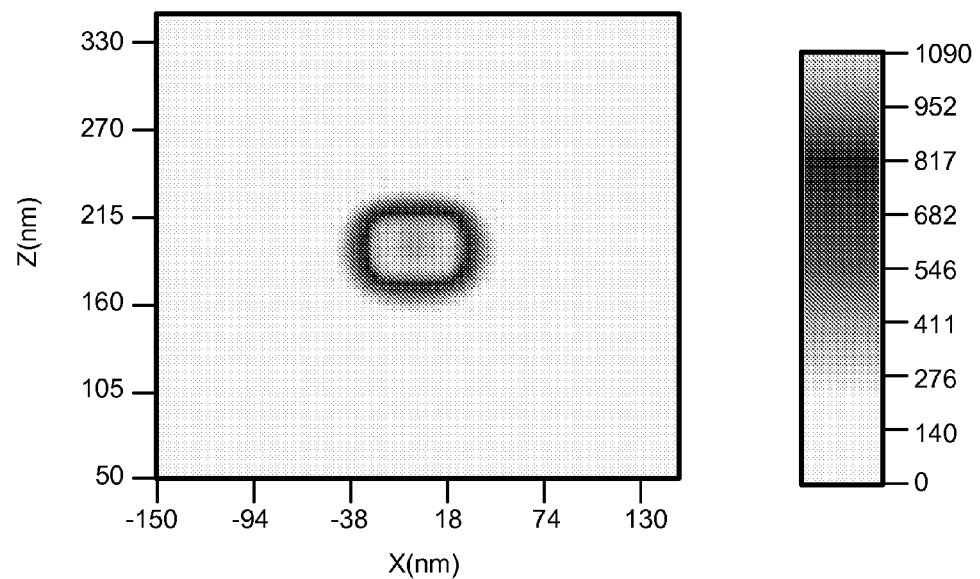

In FIG. 14, a graph shows the profile of light absorption in the middle of recording layer for the configuration shown in FIG. 6. In FIG. 15, a graph shows the profile of light absorption in the middle of recording layer for the configuration shown in FIG. 7. In both FIGS. 14 and 15, the profiles are shown in units of watts/$\mu m^3$, and the incidental optical power is 1 watt. For 40-nm wide and 30-nm thick protruded ridge, the optical spot is confined to 68 nm cross-track and 56 nm down-track in FWHM.

Figure 16:
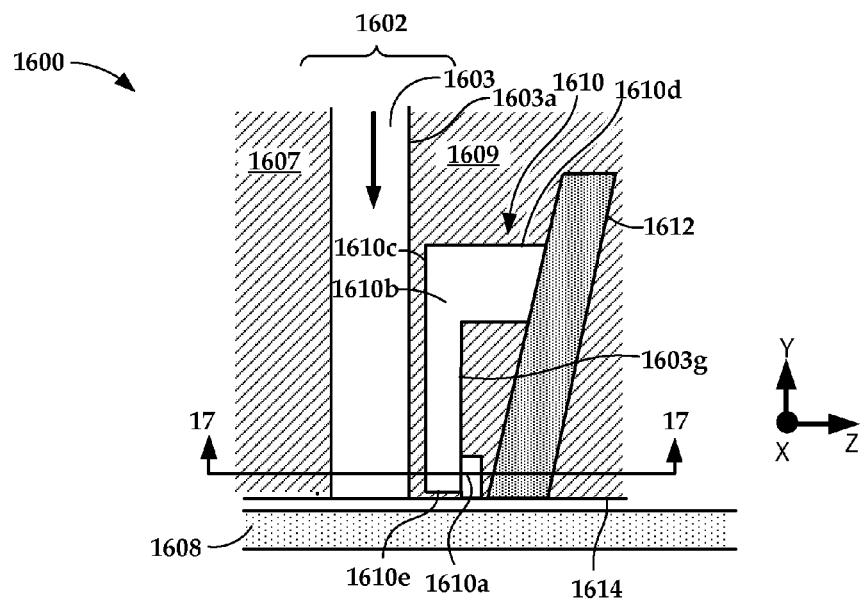
FIG. 16 is a side cross-sectional view of a near-field transducer and waveguide according to another example embodiment.

In reference now to FIG. 16, a cross-sectional view shows details of an NFT 1610 and waveguide 1602 of a HAMR apparatus 1600 according to another example embodiment. The NFT 1610, waveguide 1602, and other components are built on a substrate plane, which is parallel to the xy-plane in this view. An NFT 1610 is located proximate an xz-planar media-facing surface 1614 (e.g., ABS), which is held near a magnetic recording media 1608 during device operation. An elongated waveguide core 1603 is disposed proximate the NFT 1610, the NFT 1610 being located at or near the media-facing surface 1614.

The waveguide core 1603 may be configured as a three-dimensional channel waveguide, and is surrounded by cladding layers 1607, 1609 that have different indices of refraction than the core 1603. Other waveguide configuration may be used instead of a channel waveguide, e.g., planar waveguide. A recording pole 1612 is located alongside the NFT 1610. The recording pole 1612 generates a magnetic field (e.g., perpendicular field) used in changing the magnetic orientation of the hotspot during writing.

The NFT 1610 includes a plate-like portion 1610b of plasmonic material (e.g., gold, silver, copper). The plate-like portion 1610b has a major surface 1610c facing an elongated edge 1603a of the waveguide core 1603. Another major surface 1603g faces away from the elongated edge 1603a of the waveguide core 1603 and towards the recording pole 1612. The NFT 1610 includes an elongated ridge 1610a of plasmonic material that is disposed lengthwise on the major surface 1603g extending out an the output end 1610e of the plate-like portion 1610b. The elongated ridge 1610a may extend partially or fully between input and output ends 1610d, 1610e of the plate-like portion 1610. As with previous embodiments, the projection of the plate-like portion 1610b onto the xy-plane is narrowed at the output end.

Figure 17:
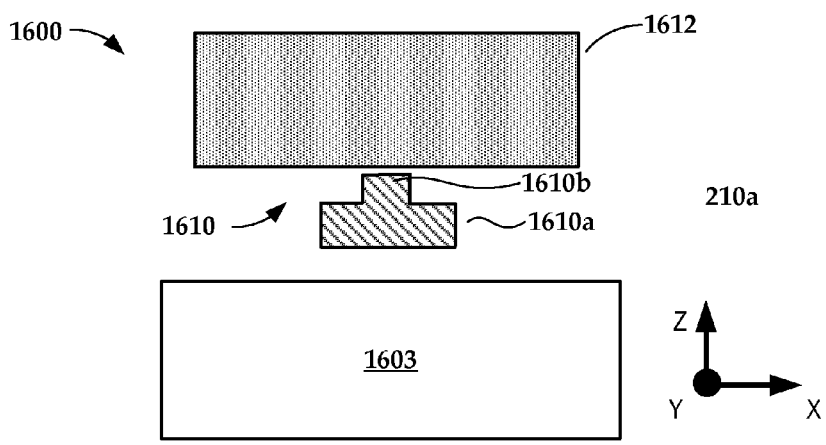
FIG. 17 is a top view of the near-field transducer and waveguide shown in FIG. 16.

In this example, surface-plasmon waves are excited at major surface 1610c nearest to the waveguide core 1603, coupled onto the major surface 1603g, and the elongated ridge 1610a is excited. The elongated ridge 1610a is shown protruding from the plate-like portion 1610b towards the media-facing surface 1614, although it may be configured to be flush with the output end 1610e, which may provide better heat-sinking to the NFT 1610. A cross sectional view corresponding to section line 17-17 of FIG. 16 can be seen in FIG. 17.

In the previous embodiments, a substrate-parallel surface of the plate-like portion has been shown with a trapezoidally-shaped circumference. In reference now to FIGS. 18-21 and 21A, diagrams illustrate other geometric shapes for the plate-like portion. In these diagrams, the outline represents a projection of the plate-like portion on a substrate-parallel plane, with an output end oriented downward and an input end oriented upwards. An elongated ridge is also shown superimposed over the shapes. These shapes may be designed with resonances that enhance the excitation efficiency.

Figures 18, 19:
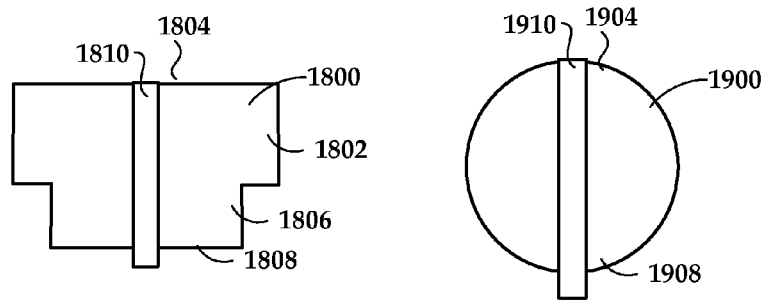
FIGS. 18-21 and 21A are plan views of alternate near-field transducer outlines according to additional embodiments.

For example, FIG. 18 shows a plate-like portion 1800 having a relatively larger rectangle 1802 proximate an input end 1804 and a relatively smaller rectangle 1806 proximate the narrowed output end 1808. An elongated ridge 1810 extends from the input end 1804 to the output end 1808. In FIG. 19, a plate-like portion 1900 is a circular disk that is narrowed at both an input end 1904 and an output end 1908. An elongated ridge 1910 extends from the input end 1904 to the output end 1908.

Figures 20, 21, 21A:
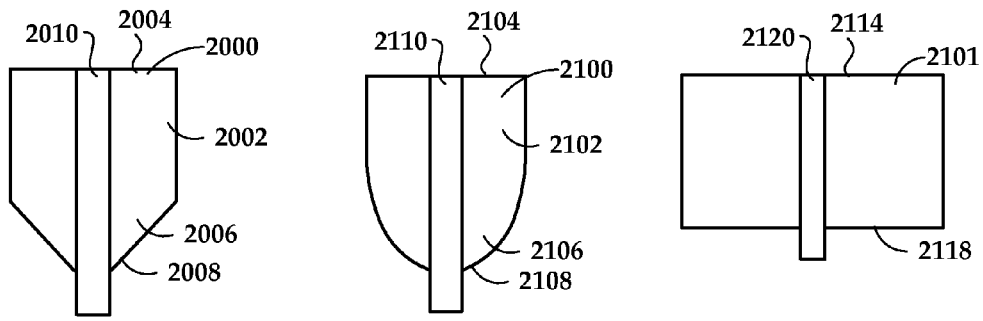
Figure 22:
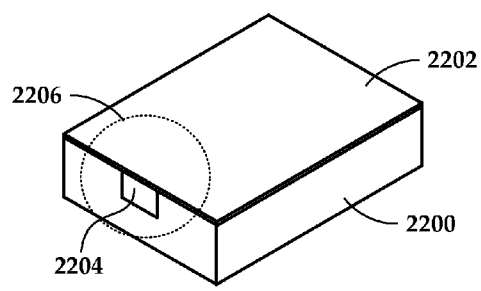
FIGS. 22-33 are diagrams illustrating steps used in manufacturing a near-field transducer and waveguide according to an example embodiment.

In FIG. 20, a plate-like portion 2000 has a rectangular portion 2002 proximate an input end 2004 and a tapered portion 2006 proximate the narrowed output end 2008. An elongated ridge 2010 extends from the input end 2004 to the output end 2008. In FIG. 21, a plate-like portion 2100 has a first portion 2102 proximate an input end 2104 and a tapered second portion 2106 proximate the narrowed output end 2108. An elongated ridge 2110 extends from the input end 2104 to the output end 2108. One or both the first and second portions 2102, 2106 includes a parabolic shape. In FIG. 21A, a plate-like portion 2101 includes a rectangular plate that is not narrowed at either an input end 2114 or an output end 2118. An elongated ridge 2120 extends from the input end 2114 to the output end 2118.

In the embodiments shown in FIGS. 18-21, 21A, and elsewhere herein, the elongated ridge may extend along the full input-to-output length of the plate-like portion, or partially therebetween. For example, in any of these embodiments, the elongated ridge may extends from the output end to a point that is less than half a distance to the input end, e.g., as shown in FIGS. 7 and 16. Also, the protruded portion may have different cross-section shape and size from the ridge on the plate.

In reference now to FIGS. 22-33, diagrams illustrate an example process that may be used to form an apparatus that includes NFT, waveguide, and recording pole according to an example embodiment. The process starts from with a layer 2200 of cladding material (e.g., dielectric) topped with a core-NFT spacing (CNS) layer 2200, which covers a waveguide core 2204. In FIGS. 23-26, a portion of the apparatus is shown, roughly corresponding to circle 2206.

Figure 23:
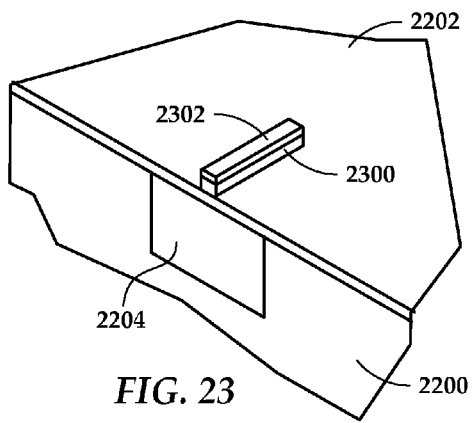
Figure 24:
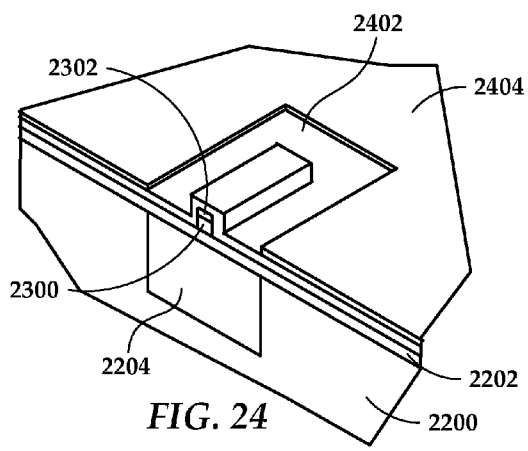

As shown in FIG. 23, a peg/ridge 2300 made of plasmonic materials (e.g., gold) can be deposited and patterned by mill with 10-20 nm thick amorphous carbon (aC) hard mask 2302. As shown in FIG. 24, a top cladding layer 2402 is deposited over the ridge with thickness the same as the ridge topography. The top surface of the deposited cladding 2400 layer will be at flat with the top surface of the ridge 2300. An aC chemical-mechanical planarization (CMP) stop layer 2404 is formed around the ridge 2300.

Figure 25:
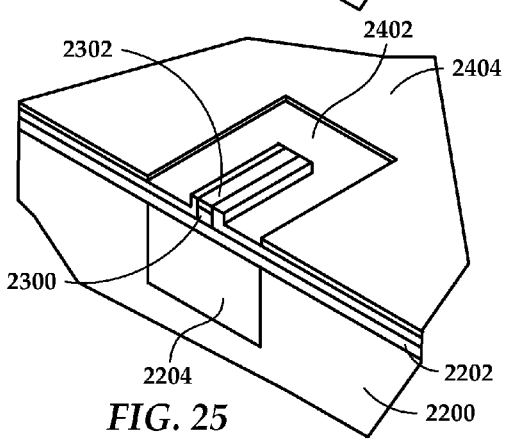
Figure 26:
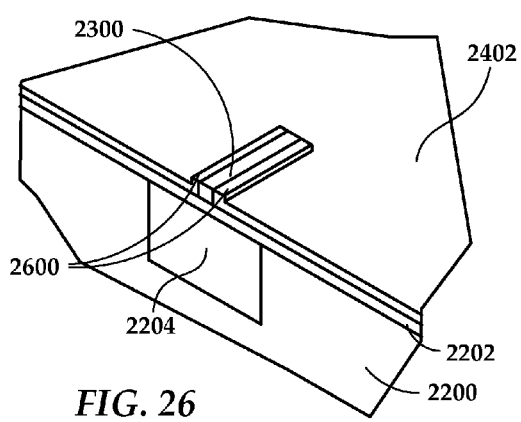

As shown in FIG. 25, the top cladding layer 2402 over the ridge 2300 can be CMP polished away until it stops on hard stop 2302. As shown in FIG. 25, the aC portions 2404, 2302 can be ashed away after CMP, leaving the ridge 2300 exposed. There may be some small topographical features 2600 around the ridge, e.g., less than 5 nm. If necessary, a very short touch up polish can be added after aC ash to make the surface totally flat.

Figure 27:
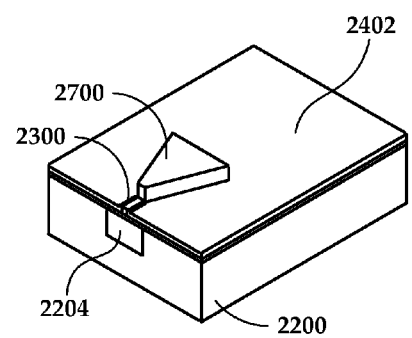
Figure 28:
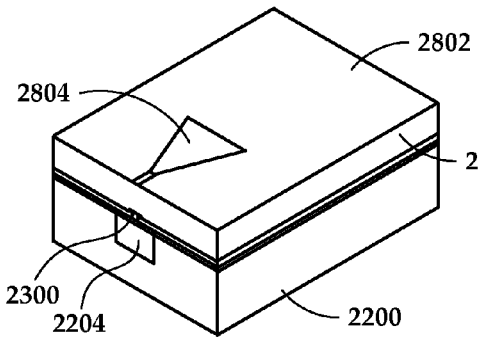
Figure 29:
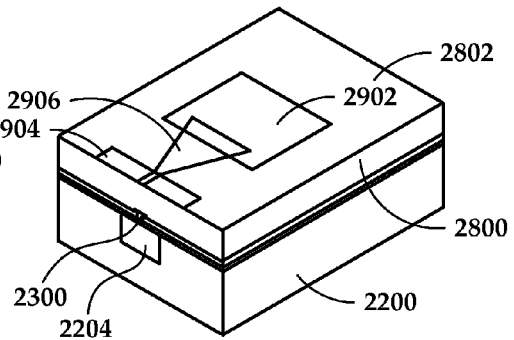
Figure 30:
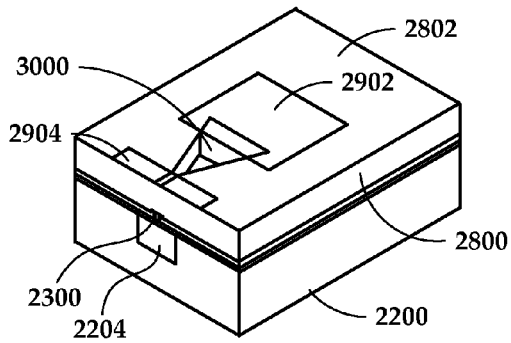

As shown in FIG. 27, a plate-like portion 2700 (e.g., trapezoidal plate) can be patterned with photoresist and liftoff process, e.g., using nano imprint lithography (NIL). An NIL lithography process or e-beam lithography may be needed to get the sharp corners on the triangle disc at such small dimensions. One way to achieve the desired shape without NIL or e-beam lithography is shown in FIGS. 28-30. As shown in FIG. 28, an aC mold layer 2800 (e.g., about 300 nm thick) can be deposited over the ridge 2300. A Ta hard mask 2802, about 5 to 10 nm thick, is deposited over aC mold layer 2800. An extended trapezoidal shape 2804 in the y-direction is patterned by photo and mill on the Ta hard mask layer 2802 only. This shape 2804 exposes the aC mold layer 2800 through the Ta hard mask layer 2802.

As shown in FIG. 29, a second Ta hard mask layer 2902, 2904 can be overlayed on the first Ta hard mask layer 2802 using liftoff method to form the final trapezoidal shape 2906 with sharp corners. At this stage, the aC mold layer 2800 is exposed through the shape 2906. As seen in FIG. 30, the aC mold layer 2800 can be etched with $O_2$ plasma etch down to NFT ridge 2300. This leaves a trapezoidal trench 3000. The trench 3000 can be filled either by deposition of gold (or other plasmonic material) followed by CMP or by electrical plating. The aC layer 2800 can be ashed away leaving the plate-like portion 2700 overlaid on the ridge 2300 as shown in FIG. 27.

Figure 31:
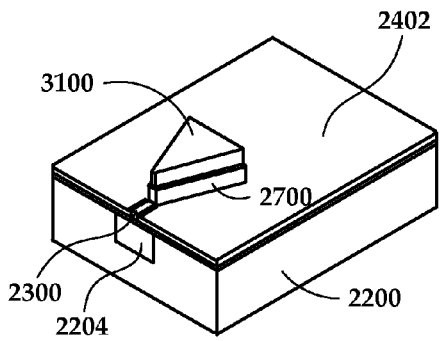
Figure 32:
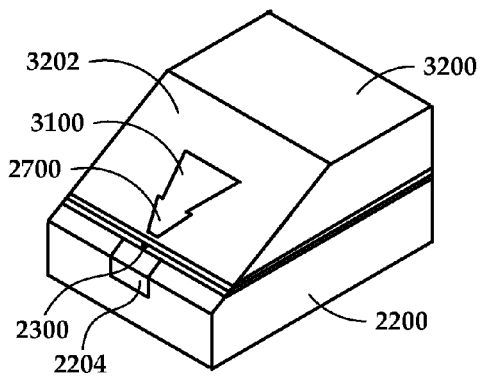
Figure 33:
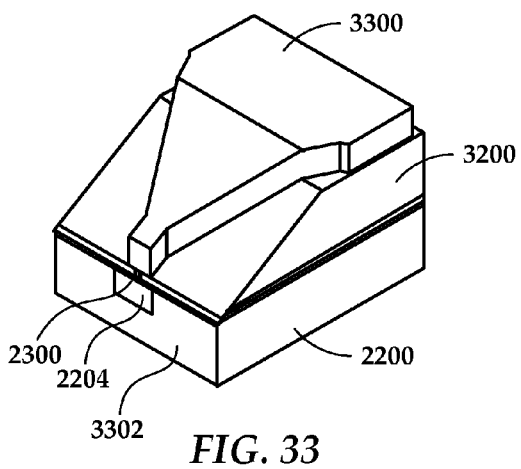

As shown in FIG. 31, a second, thicker, heatsink 3100 can be added over the first plate-like portion 2700, either by metal deposition and liftoff or by plating to thicken the heatsink part 3100. As shown in FIG. 32, a top cladding layer 3200 is deposited, and a slope wall etch forms sloped surface 3202. As shown in FIG. 33, a write pole 3300 is plated and can be finished with existing processes. This may include removing material to define media facing surface 3302.

Figure 34:
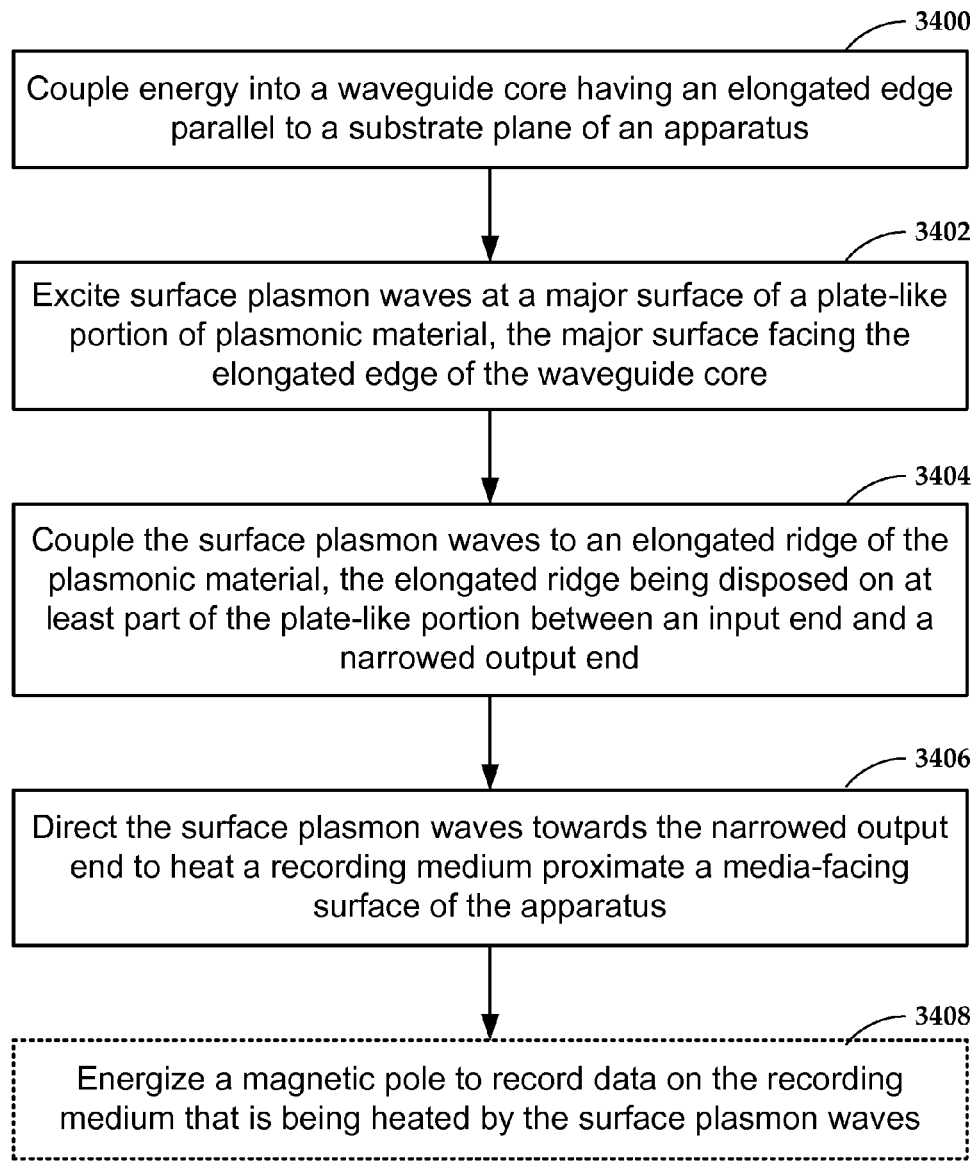
FIG. 34 is a flowchart illustrating a method according to an example embodiment.

In reference now to FIG. 34, a flowchart illustrates a method according to an example embodiment. The method involves coupling 3400 energy into a waveguide core having an elongated edge parallel to a substrate plane of an apparatus. Responsive to the energy being coupled to the waveguide, surface plasmon waves are excited 3402 at a major surface of a plate-like portion of plasmonic material, the major surface facing the elongated edge of the waveguide core. The surface plasmon waves are coupled 3404 to an elongated ridge of the plasmonic material. The elongated ridge is disposed on at least part of the plate-like portion between an input end and a narrowed output end of the plate-like portion. The surface plasmon waves are directed 3406 via the narrowed output end to heat a recording medium proximate a media-facing surface of the apparatus. The method may optionally involve energizing 3408 a magnetic pole to record data on the recording medium that is being heated by the surface plasmon waves.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
    a waveguide core having an elongated edge parallel to a substrate plane of the apparatus, wherein an output end of the waveguide core faces a media-facing surface of the apparatus;
    a plate-like portion of a plasmonic material having a major surface facing the elongated edge of the waveguide core, wherein the major surface has a narrowed output end facing the media-facing surface; and
    an elongated ridge of the plasmonic material disposed on at least part of the plate-like portion between an input end and the narrowed output end.

2. The apparatus of claim 1, wherein the elongated ridge is disposed on the major surface of the plate-like portion.

3. The apparatus of claim 1, wherein the plate-like portion comprises a second major surface facing away from the major surface, and wherein the elongated ridge is disposed on the second major surface.

4. The apparatus of claim 1, wherein the elongated ridge extends beyond the output end of the plate-like portion towards the media-facing surface.

5. The apparatus of claim 1, wherein the plate-like portion condenses an electric field received via the waveguide core towards the media-facing surface.

6. The apparatus of claim 5, wherein the elongated ridge suppresses the electric field along a circumference of the plate-like portion.

7. The apparatus of claim 5, wherein the electric field is delivered in a direction normal to the major surface of the plate-like portion.

8. The apparatus of claim 1, wherein the major surface comprises a trapezoidal shape.

9. The apparatus of claim 1, wherein the major surface comprises a parabolic shape.

10. The apparatus of claim 1, wherein the major surface comprises a relatively larger rectangle proximate the input end and a relatively smaller rectangle proximate the narrowed output end.

11. The apparatus of claim 1, wherein the elongated ridge extends from the input end to the output end.

12. The apparatus of claim 1, wherein the elongated ridge extends from the output end to a point that is less than half a distance to the input end.

13. An apparatus, comprising:
    a waveguide core extending towards a media-facing surface of the apparatus;
    a magnetic recording pole proximate the media-facing surface, and
    a near-field transducer disposed between the waveguide core and the magnetic recording pole, the near-field transducer comprising:
        a plate-like portion of a plasmonic material having a first major surface facing the waveguide core and a second major surface facing the magnetic recording pole, wherein a projection of the plate-like portion onto a substrate-parallel plane has a narrowed output end facing the media-facing surface; and
        an elongated ridge of the plasmonic material disposed on at least part of on the first major surface or the second major surface between an input end and the narrowed output end of the plate-like portion.

14. The apparatus of claim 1, wherein the elongated ridge extends beyond the output end of the plate-like portion towards the media-facing surface.

15. The apparatus of claim 13, wherein the plate-like portion receives an electric field the waveguide core in a direction normal to the first major surface and condenses the electric field towards the media-facing surface.

16. The apparatus of claim 15, wherein the elongated ridge suppresses the electric field along a circumference of the plate-like portion.

17. A method comprising:
    coupling energy into a waveguide core having an elongated edge parallel to a substrate plane of an apparatus;
    responsive to the energy being coupled to the waveguide, exciting surface plasmon waves at a major surface of a plate-like portion of a plasmonic material, the major surface facing the elongated edge of the waveguide core;

coupling the surface plasmon waves to an elongated ridge of the plasmonic material, the elongated ridge being disposed lengthwise on the plate-like portion between at least part of an input end and a narrowed output end of the plate-like portion; and directing the surface plasmon waves via the narrowed output end to heat a recording medium proximate a media-facing surface of the apparatus.

18. The method of claim 17, further comprising energizing a magnetic pole to record data on the recording medium that is being heated by the surface plasmon waves.

19. The method of claim 18, wherein the plate-like portion and the elongated ridge are located between the waveguide core and the magnetic pole, the elongated ridge facing the waveguide core.

20. The method of claim 18, wherein the plate-like portion and the elongated ridge are located between the waveguide core and the magnetic pole, the elongated ridge facing the magnetic pole.

* * * * *